United States Patent [19]
Salvucci

[11] Patent Number: 5,180,179
[45] Date of Patent: Jan. 19, 1993

[54] GAS CYLINDER CART REMOVABLE HANDLE

[76] Inventor: Frank S. Salvucci, 1401 E. Palm, El Segundo, Calif. 90245

[21] Appl. No.: 649,497

[22] Filed: Feb. 1, 1991

[51] Int. Cl.$^5$ ............................................. B62B 1/04
[52] U.S. Cl. ............................ 280/47.315; 16/114 R; 280/47.26; 280/79.5
[58] Field of Search ............... 280/47.17, 47.24, 47.27, 280/47.26, 27.315, 47.371, 655, 655.1, 652, 79.5, 79.1, 47.18, 287, 491.2, 491.5; 16/114 R; 403/293, 286, 341

[56] References Cited

U.S. PATENT DOCUMENTS

| | | | |
|---|---|---|---|
| 841,489 | 1/1907 | Drane | 403/286 |
| 2,986,401 | 5/1961 | Altadonna | 280/652 |
| 3,241,852 | 3/1966 | Muller et al. | 280/47.18 |
| 4,666,179 | 5/1987 | Adams | 280/47.28 |

FOREIGN PATENT DOCUMENTS

| | | | |
|---|---|---|---|
| 2491852 | 4/1982 | France | 280/47.17 |
| 0235407 | 7/1945 | Switzerland | 280/47.371 |
| 0959706 | 6/1964 | United Kingdom | 280/47.371 |

*Primary Examiner*—David M. Mitchell
*Attorney, Agent, or Firm*—Richard C. Litman

[57] ABSTRACT

A removable handle for gas cylinder hand trucks allows storage of the truck in a smaller space by decreasing the height of the truck. The invention is for trucks of the type having a tubular handle extending upward from the frame. The joint (or joints) where the handle removes is formed by making a cut in the tube, preferably just above the level of the top of the frame. This cut becomes a joint by adding to the cut a dowel and a bracket. The dowel is permanently fastened into the handle part of the tube, and snugly fits into the lower, or frame, end of the tube. The dowel both aligns and angularly braces the two tube sections. The bracket part consists of two plates, one fastened to the removable handle part and one fastened to the frame, which are bolted together when the joint is fastened. The plates are radially attached to adjoining parts of the handle tube and frame tube. Each plate has a hole for the bolt. The bolted plates prevent relative twisting of the two tubes and also reinforce the dowel. The invention is applicable to either a single-joint upright tubular handle or a double-joint U-shaped tubular handle.

5 Claims, 2 Drawing Sheets

GAS CYLINDER CART REMOVABLE HANDLE

FIELD OF THE INVENTION

The present invention relates to gas cylinder hand trucks, carts, or stands of the type having a handle formed from a tube.

DESCRIPTION OF THE PRIOR ART

The prior art discloses a number of carts or hand trucks with removable handles.

Bell, in U.S. Pat. No. 4,789,180 discloses a cart with a removable handle. Bell's handle has a U-shaped bracket welded to the lower end to form a Y-shape. The handle bracket is fastened to the cart frame by three snap pins of the type used on farm tractors, which pins include a straight shank with a circular snap ring. This arrangment is time-consuming to fasten, and because the snap rings do not tighten, it is liable to rattling.

U.S. Pat. No. 4,811,968 issued to Bolden shows a two-wheeled cart with a removable handle. The handle is formed of a single section of bent tubing. It includes an elastomeric handle cover at the end. The lower end of the handle tube is bolted into a vertically-aligned U-shaped channel welded to the cart frame. The bolt passes through the handle tube, passing through the tube axis and perpendicular to that axis. The Bolden handle is weakened by drilling a hole through the tubular handle: such a hole concentrates stress and invites failure. Tubes with holes often fail by folding of the tube over the hole line. Also, the handle cover, where force is exerted, is far from the attachment point. The long lever arm creates high torques which greatly stress the handle attachment. Since this great stress is concentrated on the points where the bolt presses against the relatively thin tube walls, wear is to be expected. The handle will become looser with use.

Adams teaches in U.S. Pat. No. 4,666,179 the use of a tubular handle formed from a single length of tubing bent back around to form two parallel arms. The arms slide snugly within two parallel frame tubes which have the same center to center spacing as the handle tubes. (The handle tubing outside diameter is slightly less than the frame tubing inside diameter for sliding fit.) Spring loaded pop-up buttons on the handle tubes snap into holes drilled through the frame tubes to hold the sliding tubes in a fixed relative position. The frame tubes have two pairs of such holes, one corresponding to an extended handle position for use of the cart, and the other corresponding to a contracted handle position for storage. The pop-up buttons of the Adams device are prone to failure and are difficult to work simultaneously if the handle is cocked or under force.

Myers, in U.S. Pat. No. 4,266,791 shows a two-wheeled cart with a U-shaped handle which inserts into two tubes alongside the cart (similar to the device of Adams). The handle is fixed in position by thumbscrews bearing on the handle within the side tubes. The thumbscrew depends upon friction to hold the handle; it is not a positive attachment. A layer of grease would render it useless.

None of the above inventions and patents, taken either singly or in combination, is seen to describe the instant invention as claimed.

The prior art does not disclose a handle for a wheeled hand truck, cart, or stationary stand which is both removable for compact storage of the hand truck, cart or stand, which is simple to attach and detach, and which is also strong and positive in attachment. Nor is there disclosed an attachment for a single-member handle, such as one formed from a single piece of tubing, which prevents rotation of the handle about the axis of the tubing.

Accordingly, one object of the present invention is a hand truck, cart or stand having a removable handle which allows the truck to be stored compactly when the handle is removed.

An additional object is a removable handle for a hand truck or the like having a single-member tubular handle which prevents rotation of the handle relative to the hand truck frame.

Another object of the present invention is a removable handle that securely fastens to the frame of the truck, cart or stand without loosening or rattling.

A final object is a handle attachment which is sturdy and able to stand up to rough use.

These and other objects of the present invention will become readily apparent upon further review of the following specification and drawings.

SUMMARY OF THE INVENTION

The present invention is a removable handle for gas cyclinder hand trucks. The removable handle allows storage of the truck in a smaller space by decreasing its height. The invention is for trucks of the type having a tubular handle extending generally upward from the frame. Either single-tube or double-tube handles may be adapted to the invention.

The joint (or joints) where the handle removes is formed by making a cut in the tube, preferably just above the level of the top of the gas cylinder or at some other point where the storage of the truck will be made easier thereby. This cut becomes a joint by adding to the cut a dowel and a bracket.

The dowel is permanently fastened into the handle part of the tube, and snugly fits into the lower, or frame, end of the tube. The dowel both aligns and angularly braces the two tube sections.

The bracket part consists of two plates, one fastened to the removable handle part and one fastened to the frame, which are bolted together when the joint is fastened. The plates are radially attached to adjoining parts of the handle tube and frame tube. Each plate has a hole for the bolt. The bolted plates prevent relative twisting of the two tubes and also reinforce the dowel.

BRIEF DESCRIPTION OF THE DRAWINGS

Corresponding parts in the figures are denoted by the same number.

DETAILED DESCRIPTION OF THE PREFERRED EMBODIMENTS

Figures 1, 2:
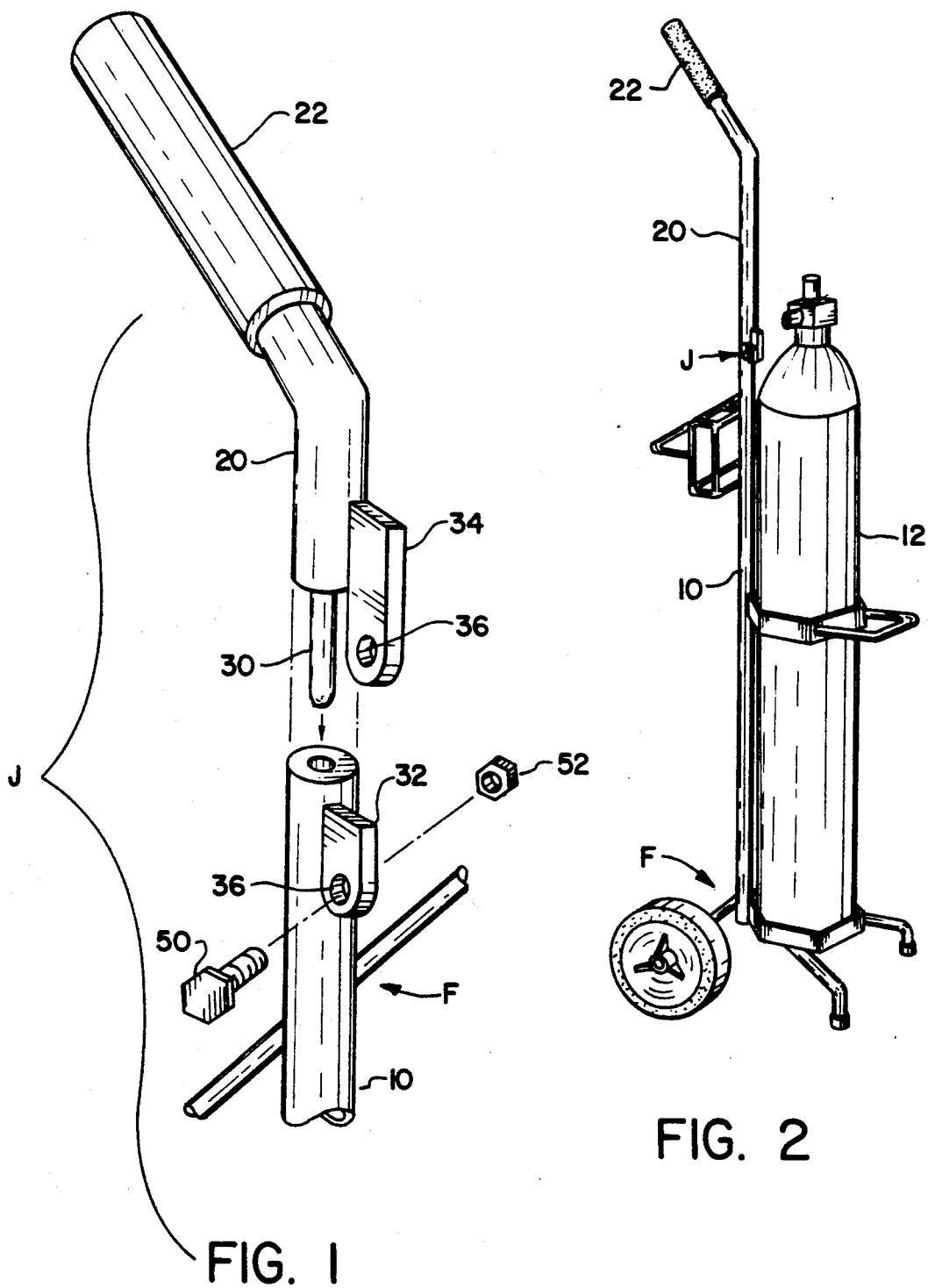
FIG. 1 is a detail perspective view, showing the upper region of a hand truck, including the invention. The invention is a handle separable from the frame, shown exploded. This hand truck has only a single upright.
FIG. 2 is a perspective view showing the hand truck of FIG. 1 in its entirety, including a gas cyclinder thereupon.

One embodiment of the present invention is shown in perspective in FIG. 2. A hand truck or cart for carrying a gas cylinder 12 includes a frame F which includes a frame upright member 10 made of strong tubing such as steel tubing. Another section of tubing comprises a handle 20. The handle 20 separates from the upright member 10 at a joint J. Preferably, the same tubing is used to make the upright 10 and the handle 20. The handle tubing ends in a grip 22 and is bent for easier grasping.

Although a wheeled hand truck is shown, the instant invention may be used on any similar device having a handle, such as a cart or stand. It is also usable on trucks, etc, having double handles, as discussed below and as illustrated in FIG. 3.

Referring again to FIG. 1, the removability of the handle 10 allows packing the hand truck frame F into a smaller space when not in use. The handle 20 is joinable to the upright 10 for use. The joint J between the hand 20 and upright 10 is shown exploded in FIG. 1.

Figure 3:
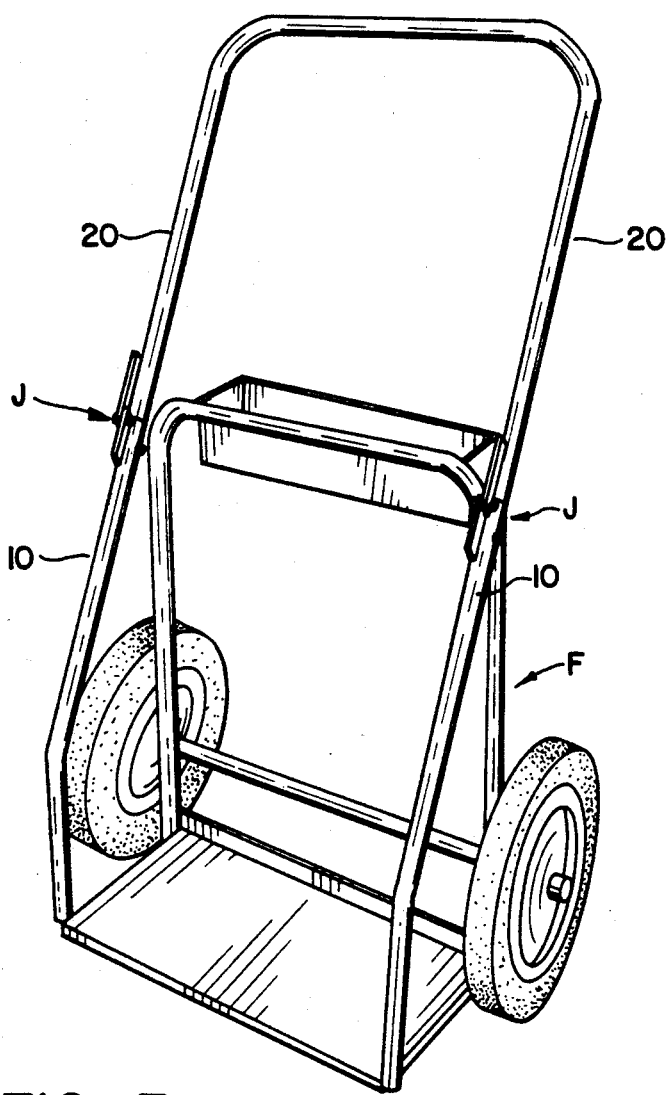
FIG. 3 is a perspective view of a second hand truck employing the invention on two ends of a U-shaped handle.

The second embodiment of the present invention is shown in FIG. 3. Here the handle tube is bent back upon itself as shown, and two joints J are employed.

To make the joint J, a dowel 30 is welded into the hollow open end of the handle 20. This dowel has an outside diameter slightly less than the inside diameter of the handle/frame tubing, so that it may be inserted. (The dowel may also be glued, screwed, or otherwise fastened. The dowel could also be formed from a length of the handle tubing itself by crimping the tubing.) The dowel 30 may be solid or hollow.

The dowel is preferably welded to the handle 20, as shown in FIG. 1, for removable insertion into the upright 10. However, the dowel 30 could also be welded into the frame upright 10 for removable insertion into handle 20.

Preferably, the section of tubing into which the dowel is inserted is straight. This allows the dowel to be inserted without first bending the dowel.

When the handle 20 is inserted into the upright tube 10, the dowel 30 acts to hold the two sections of tubing near the joint J in alignment. To further hold the handle 20 in alignment with the upright 10, to strengthen the joint J, and to prevent pulling out of the dowel 30, the tube sections are also bolted by means of a frame bracket 32 and a handle bracket 34. The brackets are preferably steel plates welded to the tubing.

Each bracket has a hole 36; The two brackets are so disposed that when the joint J is assembled the holes 36 may be made to coincoide by proper angular alignment of the assembled joint (that is, by rotating the handle 20 in the upright 10 until the bracket faces meet).

For this to occur, the brackets are slightly offset from radial orientation to the tube axis. That is, the planes of the brackets do not pass directly through the tube axes. This offset allows the plane faces of the two brackets in the region of the holes 36 to meet flush.

When the joint J is assembled the brackets 32, 34 are flush and the holes 36 are aligned or coaxial. When the holes 36 are aligned a bolt 50 may be passed through the holes 36, a nut 52 threaded onto the bolt 50, and the nut tightened to firmly lock the joint J.

The bolt 50 draws the two adjoining face surfaces of the brackets 32 and 34 tightly up against one another. This eliminates any rattling or looseness, and tends to prevent any relative motion of the brackets 32, 34 by the great force of the bolt, which causes substantial friction forces between the brackets 32, 34.

Figure 4:
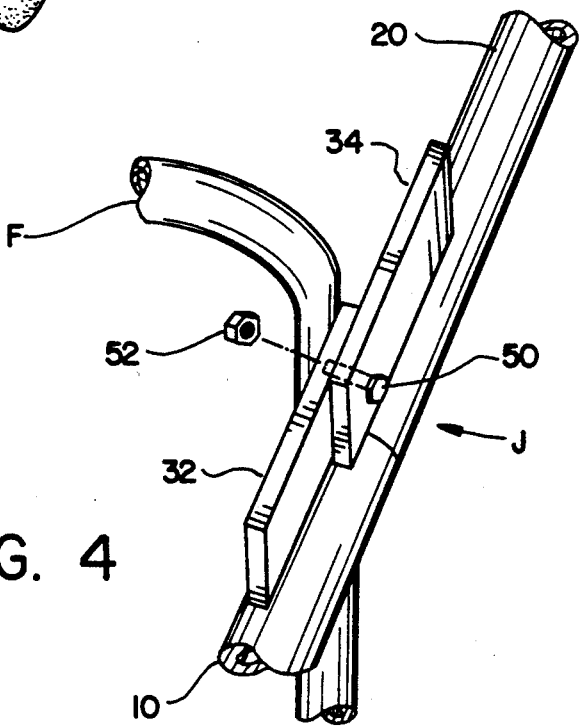
FIG. 4 is a detail of one joint of the truck of FIG. 3.

The joints of the double-joint hand truck shown in FIG. 3 is formed similarly (as shown in FIG. 4), and operate similarly to the joint of the single-upright truck described above.

In the case of the single-tube handle shown in the FIGS. 1 and 2, the bolted brackets 32, 34 also prevent relative rotation of the two tubes 10, 20. This prevention is needed in the case of the single-tube handle shown. Other sorts of hand trucks may not require prevention of rotation. For example, one common type of hand truck, shown in FIGS. 3 and 4, employs a two-tube handle formed by bending a single piece of tubing until it is bent back parallel to itself in a U-shape. This two-tube type does not need any anti-rotation means, since each tube prevents the other from rotating. Some means for preventing the tubes from separating is still needed, though. The bracket and bolt arrangement of the present invention accomplishes either goal or both.

The flat brackets of the instant invention are better suited than other sorts of brackets would be to the high torques that can be expected in the use of the hand truck of FIGS. 1 and 2, between the handle 20 and upright 10. This is for the following reason:

The bend in the handle 20 will generate torques, causing forces which will be multiplied due to the unequal moment arms of the handle grip 22 and the bracket hole 36 about the relative rotation axis of the handle/upright tubing. On the other hand, forces tending to slide the handle 20 out of the upright 10 will not be multiplied. In addition, the bolt 50 is stronger in tension than in shear.

The brackets are preferably mounted on the cylinder side of the tubing as shown. This puts the bracket connection in tension when the handle 20 is pulled back to tilt the truck for rolling. The brackets may be mounted on any side of the tubing if needed.

It is to be understood that the present invention is not limited to the sole embodiment described above, but encompasses any and all embodiments within the scope of the following claims. In particular, other fastening means may be used in place of the bolts and brackets disclosed above. Also, tubing or channels of other cross-section than circular may be used.

I claim:

1. In a cart means having a frame and means for securely holding an object, and including at least one tubular generally upright member having a cylindrical inner bore, the improvement comprising:
   a frame part of said member permanently affixed to said frame, said frame part having a frame part end;
   a handle part of said member having a handle part end abutting said frame part end;
   a cylindrical dowel disposed within said bore of said member and extending from said handle part into said frame part, said dowel closely fitting within said bore; and
   disengagable attachment means for holding said handle part against translational and rotational motion relative to said frame part; whereby
   said handle part may be removed from said frame part for storage and wherein said attachment means includes:
   a generally planar frame bracket attached to an exterior surface of said frame part adjacent said frame part end, said frame bracket disposed in a generally radial extension from a center line of said bore of said frame part, said frame bracket including a first hole therethrough; and a generally planar handle bracket attached to an exterior surface of said handle part adjacent said handle part end, said handle bracket disposed in a generally radial extension from a center line of said bore of said handle part, said handle bracket including a second hole therethrough; and wherein said frame bracket, said first hole, said handle bracket, and said second hole are so disposed that frame bracket and said handle bracket may be made flush, and said first hole and said second hole may be coaxially aligned and adjacent one to another for passage of a bolt simultaneously through both said first hole and said second hole when said handle part is rotationally oriented to said frame part; whereby said bolt may be passed through said first and second holes and a nut tightened thereupon for pressing said frame bracket and said handle bracket together to prevent said frame part from separating from said handle part.

2. A cart means as in claim 1 wherein
a portion of said dowel is permanently fixed into said bore of said handle part.

3. A cart means as in claim 1 wherein
there are exactly two of said tubular generally upright members, and
respective handle parts of said members are joined distal said handle part ends, whereby
said handle parts may be easily removed and joined to said frame at once.

4. A cart means as in claim 3 wherein
said handle parts are formed from a single bent section of tubing.

5. A cart means as in claim 1 wherein
a portion of said dowel is permanently fixed into said bore of said handle part.

* * * * *